US009195463B2

(12) United States Patent
Hickey et al.

(10) Patent No.: US 9,195,463 B2
(45) Date of Patent: Nov. 24, 2015

(54) PROCESSING CORE WITH SPECULATIVE REGISTER PREPROCESSING IN UNUSED EXECUTION UNIT CYCLES

(75) Inventors: Mark J. Hickey, Rochester, MN (US); Adam J. Muff, Rochester, MN (US); Matthew R. Tubbs, Rochester, MN (US); Charles D. Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 13/307,575

(22) Filed: Nov. 30, 2011

(65) Prior Publication Data

US 2013/0138925 A1 May 30, 2013

(51) Int. Cl.
G06F 9/302 (2006.01)
G06F 9/38 (2006.01)
G06F 7/499 (2006.01)
G06F 9/30 (2006.01)

(52) U.S. Cl.
CPC ............... *G06F 9/383* (2013.01); *G06F 7/499* (2013.01); *G06F 9/30014* (2013.01); *G06F 9/30025* (2013.01); *G06F 9/384* (2013.01); *G06F 9/3836* (2013.01); *G06F 9/3875* (2013.01); *G06F 9/3885* (2013.01)

(58) Field of Classification Search
CPC ..... G06F 7/499; G06F 7/49936; G06F 9/383; G06F 9/30025; G06F 9/30014; G06F 9/3875; G06F 9/3836; G06F 9/384; G06F 9/3885

USPC .................................................. 712/214, 222
See application file for complete search history.

(56) References Cited

U.S. PATENT DOCUMENTS

| 4,068,299 | A | * | 1/1978 | Bachman | 1/1 |
| 4,991,130 | A | * | 2/1991 | Kojima | 708/205 |
| 6,094,717 | A | * | 7/2000 | Merchant et al. | 712/32 |
| 2003/0233559 | A1 | * | 12/2003 | Asano et al. | 713/189 |
| 2008/0046698 | A1 | * | 2/2008 | Ahuja et al. | 712/224 |
| 2009/0248777 | A1 | * | 10/2009 | Handlogten | 708/500 |

OTHER PUBLICATIONS

Register File, Nov. 7, 2010, Wikipedia, pp. 1-3.*
Joong-Seok Moon, EE577b Register File, Sep. 20, 2006, 16 pages, [retrieved from the internet on Mar. 18, 2015], retrieved from URL <http://www-classes.usc.edu/engr/ee-s/577bb/regfile.pdf>.*

* cited by examiner

*Primary Examiner* — Andrew Caldwell
*Assistant Examiner* — Jyoti Mehta
(74) *Attorney, Agent, or Firm* — Middleton Reutinger

(57) ABSTRACT

A method and circuit arrangement speculatively preprocess data stored in a register file during otherwise unused cycles in an execution unit, e.g., to prenormalize denormal floating point values stored in a floating point register file, to decompress compressed values stored in a register file, to decrypt encrypted values stored in a register file, or to otherwise preprocess data that is stored in an unprocessed form in a register file.

25 Claims, 7 Drawing Sheets

PROCESSING CORE WITH SPECULATIVE REGISTER PREPROCESSING IN UNUSED EXECUTION UNIT CYCLES

FIELD OF THE INVENTION

The invention is generally related to data processing, and in particular to processor architectures.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processing cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multi-threading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A SIMD or vector execution unit typically includes multiple processing lanes that handle different datapoints in a vector and perform similar operations on all of the datapoints at the same time. For example, for an architecture that relies on quad(4)word vectors, an SIMD or vector execution unit may include four processing lanes that perform the identical operations on the four words in each vector.

The aforementioned techniques may also be combined, resulting in a multi-threaded vector execution unit architecture that enables multiple threads to issue SIMD instructions to an SIMD execution unit to process "vectors" of data points at the same time.

In addition, it is also possible to employ multiple execution units in the same processor to provide additional parallelization. The multiple execution units may be specialized to handle different types of instructions, or may be similarly configured to process the same types of instructions.

Typically, a scheduling algorithm is utilized in connection with issue logic to ensure that each thread in a multi-threaded architecture is able to proceed at a reasonable rate, with the number of bubbles in the execution unit pipeline(s) kept at a minimum. In addition, when multiple execution units are used, the issuance of instructions to such execution units may be handled by the same issue unit, or alternatively by separate issue units.

Another technique that may be used to improve the performance of a processor is to employ a microcode unit or sequencer to automatically generate instructions for execution by an execution unit. A microcode unit or sequencer responds to commands, e.g., via dedicated instructions in an instruction set, and in response, outputs a sequence of instructions to be executed by the processor. In much the same way that a software procedure can be used to perform a repeatable sequence of steps in response to a procedure call in a software program, a microcode unit or sequencer can be triggered by a command or instruction to perform a repeatable operation.

While the aforementioned techniques have been applied to improve the throughput of instructions in a processor and minimize pipeline bubbles, areas for improvement still exist. For example, in some instances the data stored in a register file may need to be preprocessed before it can be used by instructions that reference the data. In floating point execution units, denormal floating point values stored in a floating point register file may need to be normalized before use. A denormal number is a non-zero number that is smaller than the smallest normal number supported in a floating point system, and is used to fill an underflow gap around zero in floating point arithmetic. In many floating point execution units, denormal numbers must be normalized by shifting the significand or fraction portions of such numbers one bit to the left and decrementing the corresponding exponent portions.

In conventional floating point execution units, whenever a denormal floating point number is referenced as an operand of a floating point instruction, the floating point execution unit is required to normalize the number and reexecute the floating point instruction. Doing so typically requires a flush of the pipeline, normalization of the denormal value, storage of the normalized value back in the register file or in a scratch register, and reissuing the original floating point instruction, all of which constitute a significant performance hit.

Other types of data stored in a register file may also be suboptimal, and require preprocessing prior to use. For example, data may be stored in a register file in a compressed or packed format, and may need to be decompressed or unpacked prior to use. Data may also be stored in an encrypted format and require decryption prior to use. In both instances, similar performance penalties may result if a floating point instruction attempts to use such data prior to decompressing or decrypting the data.

Therefore, a significant need continues to exist in the art for a manner of minimizing the performance overhead associated with preprocessing data stored in a register file.

SUMMARY OF THE INVENTION

The invention addresses these and other problems associated with the prior art by providing a method and circuit arrangement that speculatively preprocess data stored in a register file during otherwise unused cycles in an execution unit, e.g., to prenormalize denormal floating point values stored in a floating point register file, to decompress compressed values stored in a register file, to decrypt encrypted values stored in a register file, or to otherwise preprocess data that is stored in an unprocessed form in a register file.

In one embodiment consistent with the invention, for example, scavenging logic coupled to an execution unit scans a register file and identifies unprocessed data in the register file and causes instructions to be issued during unused cycles of the execution unit to preprocess the data. The preprocessed data may then be stored back into the register file or stored in one or more scratch registers. Moreover, in instances where the preprocessed data is not written back to the same register in which the unprocessed data is stored, a subsequent instruction that references the register in which the unprocessed data resides may be modified to reference the register within which is stored the preprocessed data.

Consistent with one aspect of the invention, a processing core includes an issue unit, a register file and an execution unit, where the issue unit is configured to issue instructions from an instruction stream to the execution unit for execution thereby. Instructions are executed in the processing core by speculatively preprocessing an unprocessed value detected in a register in the register file to generate a processed value corresponding to the unprocessed value, and after speculatively preprocessing the unprocessed value, executing an instruction in the execution unit that references the register in the register file such that the instruction uses the processed value.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
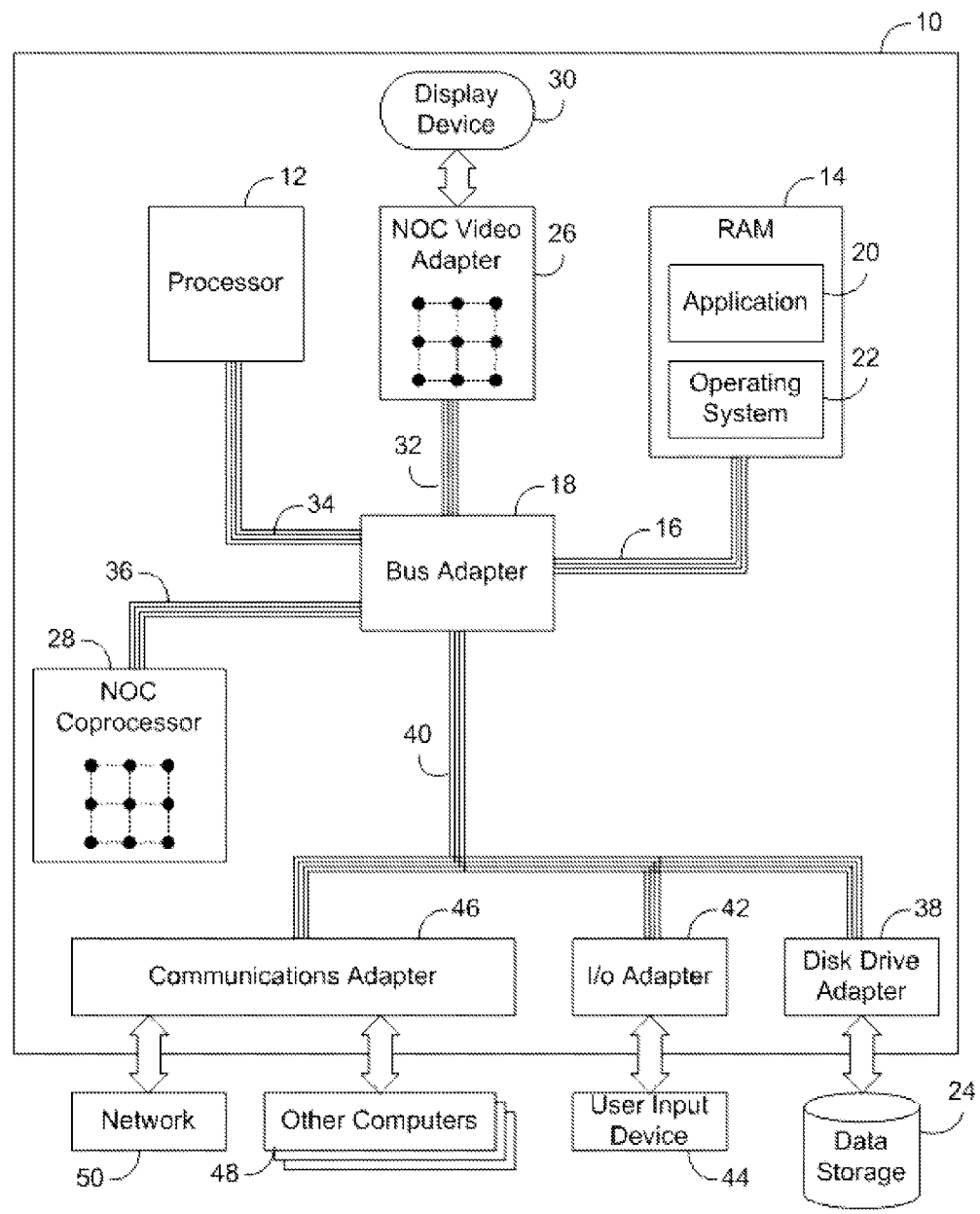
FIG. 1 is a block diagram of exemplary automated computing machinery including an exemplary computer useful in data processing consistent with embodiments of the present invention.

Embodiments consistent with the invention speculatively preprocess data stored in a register file during otherwise spare cycles in an execution unit such that subsequent instructions that would otherwise use the unprocessed data can use processed data generated during speculative preprocessing.

Speculative register preprocessing consistent with the invention may be used, for example, to prenormalize denormal floating point values stored in a floating point register file. Alternatively, speculative register preprocessing may be used to perform other preprocessing of data that is stored in an unprocessed or unoptimized form within a register file, e.g., to decompress compressed values, to decrypt encrypted values, to compress decompressed values, to encrypt decrypted values, etc. Speculative register preprocessing may also be used in some embodiments to perform mathematical operations such as divides, square roots, etc.

In some embodiments of the invention, speculative register preprocessing is implemented using scavenger logic that scans through a register file to identify unprocessed data and speculatively preprocesses the unprocessed data by causing instructions to be issued to an execution unit during spare cycles of the execution unit. The scavenger logic operates speculatively, such that register data is not preprocessed specifically in response to any instruction in an instruction stream that references the register, but is instead preprocessed with the expectation that a subsequent, as yet issued, instruction in an instruction stream may later reference that register without having to preprocess the data stored in the register. An instruction stream consistent with the invention includes a plurality of instructions representing a path of execution, typically associated with a common thread, process, application, or program, and that is executed by a processing core.

The scavenger logic also typically operates in the background, i.e., separate from the issuance and execution of instruction streams by a processing core, such that the identification of unprocessed data does not consume any of the execution cycles of the instruction streams executed by the processing core. In addition, the scavenger logic typically causes instructions to be issued to preprocess the unprocessed data only during spare cycles (i.e., bubbles) for the execution unit, thereby consuming slots in an execution unit that would otherwise not be processing instructions from any instruction streams being executed by the processing core, whether due to dependencies, pipeline flushes, etc. It will be appreciated that typically every execution unit, whether single-threaded or multi-threaded, scalar or vector, fixed point or floating point, pipelined or non-pipelined, etc., will necessarily have spare cycles occur from time to time, so implementing preprocessing of unprocessed data in a register file typically can be performed without adversely impacting the processing of instructions from instruction streams. In some embodiments, however, preprocessing instructions may be issued within the normal flow of instructions being executed by an execution unit and delay the execution of one or more instruction streams being executed by the execution unit.

In a specific embodiment discussed hereinafter, for example, speculative register preprocessing is used to prenormalize denormal floating point values stored in a floating point register file by scanning the floating point register file with background scavenging logic coupled to the floating point register file to identify a floating point register that stores a denormal floating point value, in response to identifying the floating point register, issuing a first instruction to a floating point execution unit coupled to the floating point register file during a spare cycle of the floating point execution unit, where the first instruction is configured to normalize the denormal floating point value to generate a normal floating point value, storing the normal floating point value in a scratch register in response to execution of the first instruction by the floating point execution unit, and in response to a second instruction from an instruction stream that references the floating point register that stores the denormal floating point value, modifying the second instruction to reference the scratch register and issuing the modified second instruction to the floating point execution unit such that the modified second instruction uses the normal floating point value. It will be appreciated, however, that other implementations may preprocess other types of unprocessed data, so the invention is not limited to the particular implementations disclosed herein.

Other variations and modifications will be apparent to one of ordinary skill in the art. Therefore, the invention is not limited to the specific implementations discussed herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
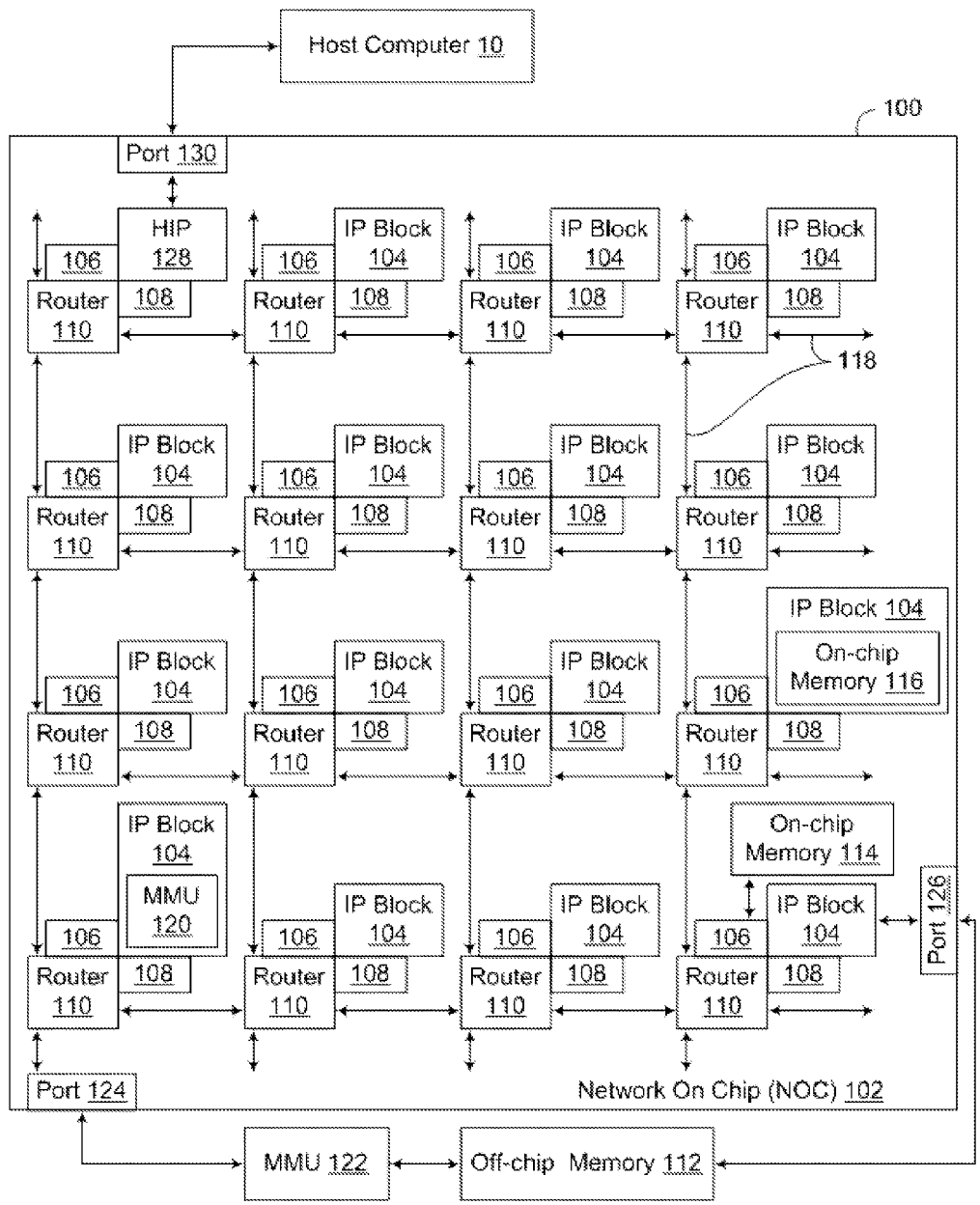
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
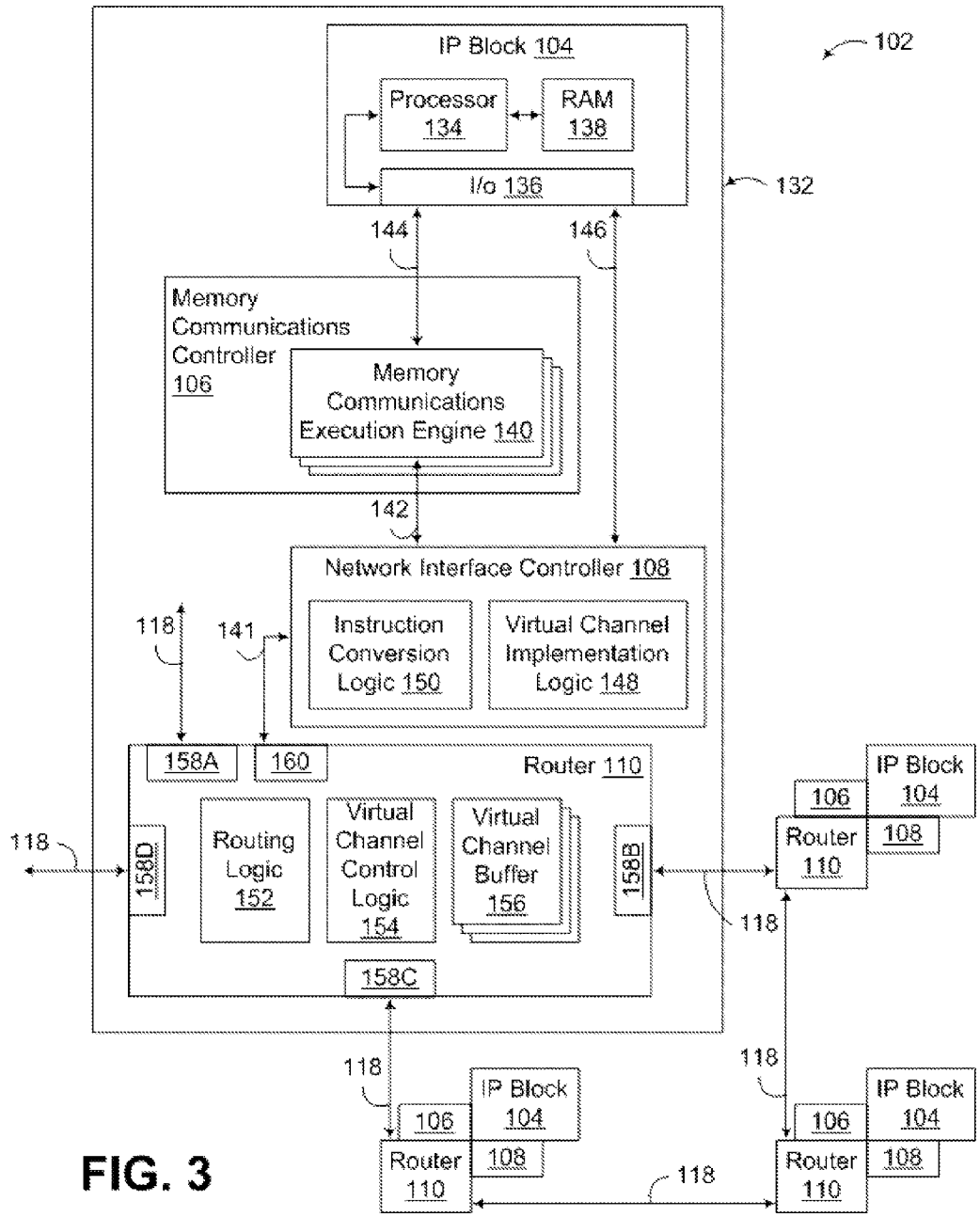
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
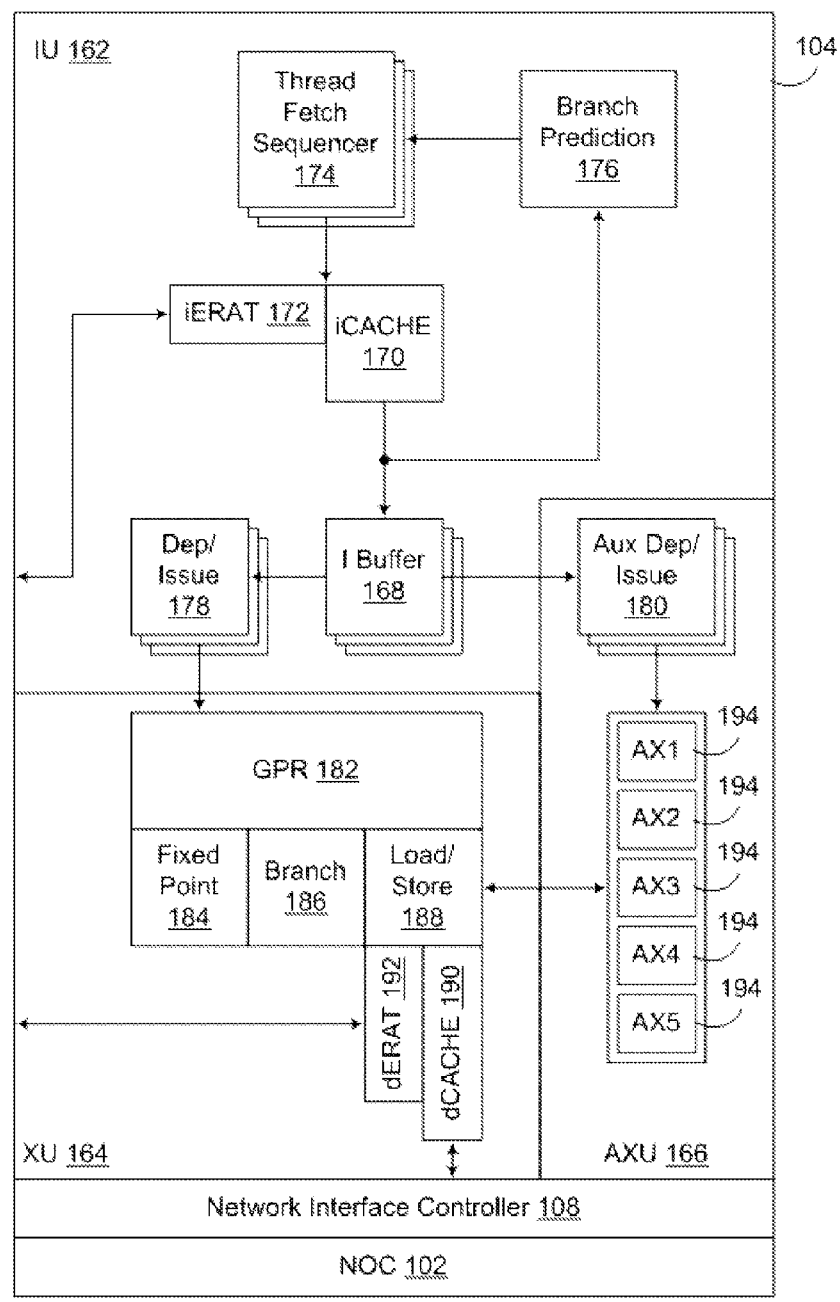
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Speculative Register Preprocessing

Figure 5:
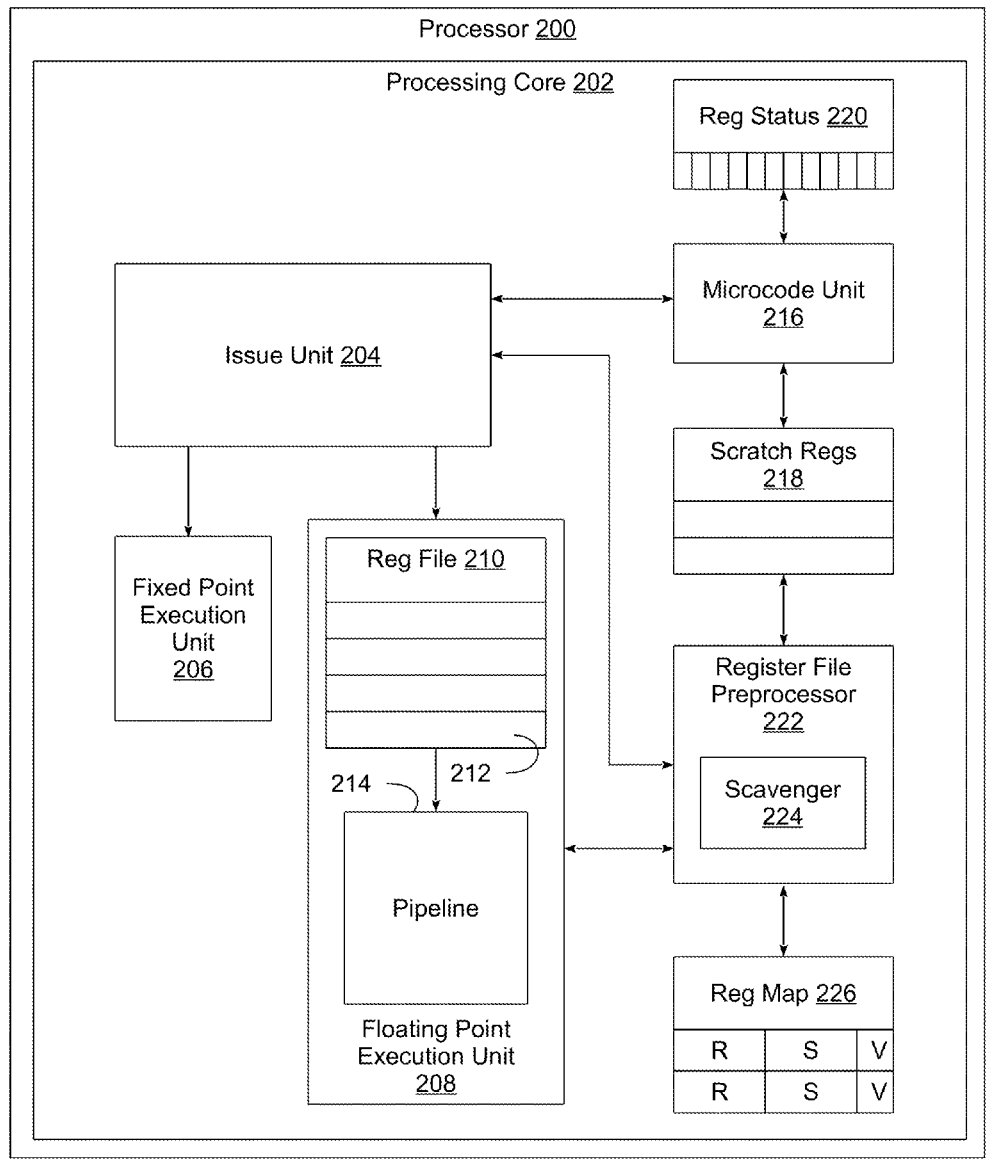
FIG. 5 is a block diagram of an exemplary data processing system incorporating speculative register preprocessing consistent with the invention.

Turning now to FIG. 5, a data processing system is illustrated incorporating a processor 200 including a processing core 202 with an instruction or issue unit 204, fixed point execution unit 206, and floating point execution unit 208, and within which speculative register preprocessing consistent with the invention may be implemented. Floating point execution unit 208 includes a floating point register file 210 with a plurality of registers 212 and at least one execution pipeline 214. Processing core 202 may be implemented, for example, in a similar manner to IP block 104 of FIG. 4, although it will be appreciated that practically any single or multi-core processor design may be used in the alternative.

It will be appreciated that floating point execution unit 208 may be implemented as an auxiliary execution unit (AXU), or as any of a number of different types of execution units, accelerators, specialized logic, engines, etc. Processing core 202 may also support as few as one register file and/or execution unit, or may support greater numbers of register files and/or execution units. Floating point execution unit 208 may be single-threaded or multi-threaded, and may be a scalar or vector execution unit. Moreover, it will be appreciated that speculative register preprocessing may be used in connection with fixed point execution unit 206, or with any other execution unit that relies on data stored in a register file, where that data may be stored in the register file in an unprocessed state and later require some degree of processing before use, e.g., in connection with normalizing prenormal floating point numbers, compressing/decompressing data, encrypting/decrypting data, etc.

Processing core 202 may also include a sequencer or microcode unit 216 that may be used to process microcode instructions in an instruction stream by issuing corresponding sequences of instructions to execution units 206, 208. Microcode unit 216 typically includes a set of scratch registers 218 that are typically used by the microcode unit 216 for internal calculations, and that are typically not visible to software. In addition, one or more register status special purpose registers (SPRs) 220 may also be used by microcode unit 216 to determine the status of each register in register file 210 (as well as each scratch register 218 and any registers in a fixed point register file used by fixed point execution unit 206), e.g., to determine whether each register is valid (currently storing valid data). SPRs 220 are typically updated whenever data is stored in a register in register file 210 or whenever a process releases a register in the register file.

To implement speculative register preprocessing, processing core 202 includes register file preprocessor logic 222 incorporating background scavenger logic 224 that operates in the background and identifies registers in register file 210 to be preprocessed, e.g., registers storing denormal floating point values requiring prenormalization, and preprocesses those registers by causing instructions to be issued to floating point execution unit 208 to perform such preprocessing. While in some embodiments, register file preprocessor logic 222 may utilize dedicated scratch registers to store preprocessed register values, or may store preprocessed register values back into their source registers, in the illustrated embodiment register file preprocessor logic 222 utilizes scratch registers 218 to store preprocessed register values. In addition, while other data structures may be used to identify what registers have been preprocessed, in the illustrated embodiment SPRs 220 are used to indicate what registers include unprocessed data and/or have been preprocessed.

Also in the illustrated embodiment, register file preprocessor logic 222 includes a register map 226 that includes a plurality of entries mapping preprocessed registers in register file 210 to scratch registers 218 so that instructions that reference a register in register file 210 that has been preprocessed. Each entry desirably identifies a register (R) in register file 210 that stores unprocessed data, a corresponding scratch register (S) 218 that stores the result of preprocessing that unprocessed data, and a indicator (V) that indicates whether or not the entry is valid.

It will be appreciated that other data structures may be used to store preprocessed data or other status information, so the invention is not limited to the particular embodiments disclosed herein.

Figure 6:
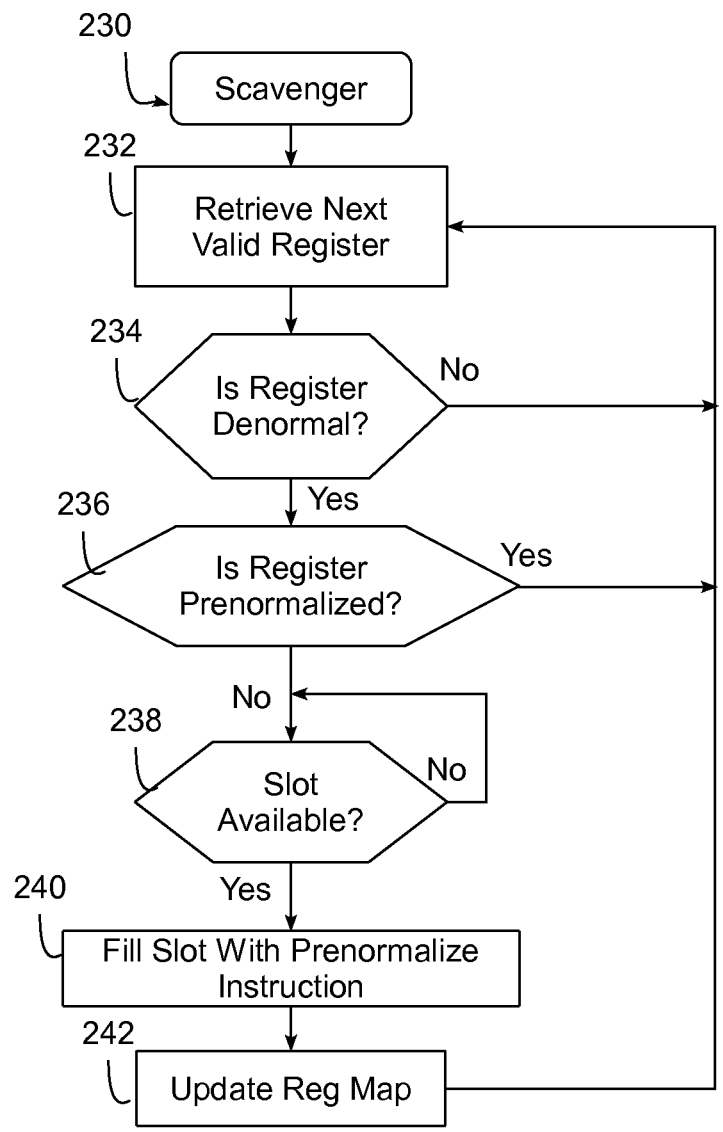
FIG. 6 is a flowchart illustrating an exemplary sequence of operations performed to preprocess unprocessed data in a register file using the scavenger logic referenced in FIG. 5.

Now turning to FIG. 6, this figure illustrates a sequence of operations 230 performed by scavenger logic 224 to speculatively preprocess register data in a manner consistent with the invention. In this implementation, the scavenger logic searches floating point register file 210 for denormal data suitable for speculative prenormalization, and causes prenormalize instructions to be issued by issue unit 204 to floating point execution unit 208 to prenormalize the denormal data and store the prenormalized data in scratch registers 218.

As such, scavenger logic 224 selects a next valid register in register file 210 (block 232). For example, a next valid register may be selected by sequencing through each valid register in the register file in a sequential manner. Alternatively, the scavenger logic may monitor the instruction streams issued by issue unit 204 and catalog what registers potentially contain denormal data.

Next, in block 234, the scavenger logic determines whether the data stored in the register is denormal (block 234). If not, control returns to block 232 to select another valid register. If, however, the register stores denormal data, control passes to block 236 to determine whether the register has already been prenormalized, e.g., by accessing register map 226 to determine whether a valid entry exists for the denormal register, or accessing SPRs 220 to determine whether a status bit for the register indicates that the register has been prenormalized.

If the register has already been prenormalized, block 236 passes control to block 232 to select another valid register. If, however, the register has not yet been prenormalized, control passes to block 238 to wait until a spare execution slot is available in floating point execution unit 208, and once a spare execution slot is detected, control passes to block 240 to cause the issue unit 204 to fill the spare execution slot with a prenormalize instruction, with the denormal register referenced as the source and an unused spare register 218 referenced as the destination, such that execution of the prenormalize instruction results in prenormalized data corresponding to the denormal register being stored in the selected scratch register. Block 242 then updates register map 226 to add a valid entry mapping the denormal register to the scratch register within which the corresponding prenormalized data is stored. Control then returns to block 232 to continue searching for other registers storing unprocessed denormal data.

In the illustrated embodiment, prenormalize instructions are actually issued by issue unit 204 under the direction of scavenger logic 224. However, in other embodiments, scavenger logic 224 may directly issue prenormalize instructions to floating point execution unit 208. Furthermore, it will be appreciated that the actual detection of denormal data may be performed either by the scavenger logic or by other logic in the processing core, e.g., the floating point execution unit 208, whereby the scavenger logic may determine whether a register includes denormal data merely by accessing a corresponding status bit in SPRs 220.

Figure 7:
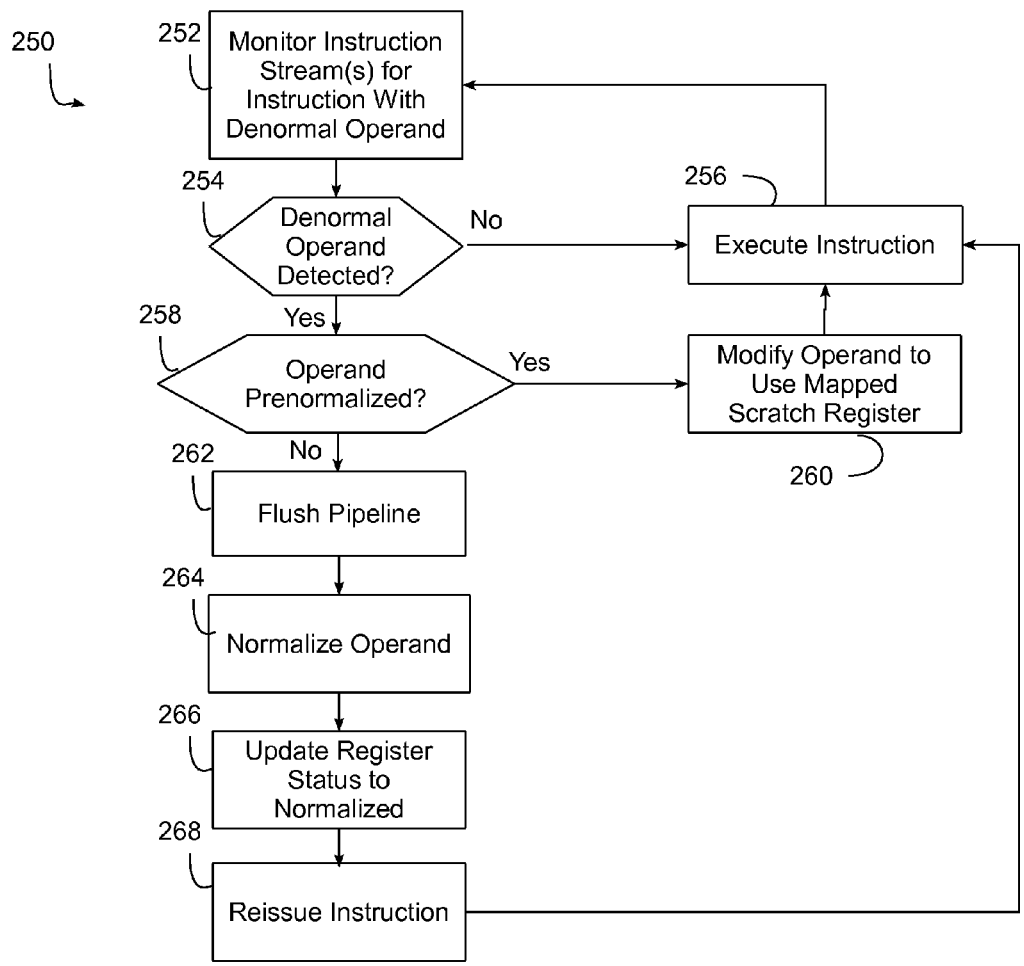
FIG. 7 is a flowchart illustrating an exemplary sequence of operations performed to modify instructions that reference unprocessed data using the register file preprocessor referenced in FIG. 5.

Now turning to FIG. 7, this figure illustrates an exemplary sequence of operations 250 performed to modify instructions that reference unprocessed data. This sequence of operations may be implemented, for example, within register file processor 222, issue unit 204 and/or floating point execution unit 208. First, in block 252, one or more instruction streams are monitored for instructions with references to denormal operands, e.g., by checking SPRs 220 to determining whether any of the operands referenced by an instruction are registers that are indicated as storing denormal data.

Next, block 254 determines whether an instruction with a reference to a denormal operand is detected, and if not, control passes to block 256 to execute the instruction, and then back to block 252 to continue monitoring. If, however, the instruction is determined to include a denormal operand, control passes to block 258 to determine whether the operand has been prenormalized, e.g., by checking either SPRs 220 or register map 226. If so, control passes to block 260 to modify the instruction to replace the reference to the denormal operand with a reference to the scratch register 218 that stores the corresponding prenormalized data, determined via accessing register map 226. Control then passes to block 256 to execute the modified instruction, such that the instruction will use the prenormalized data stored in the scratch register rather than the denormal data in the originally referenced register.

Returning to block 258, if the operand has not been prenormalized, control passes to block 262 to flush the pipeline, then to block 264 to normalize the operand by issuing a prenormalize instruction that normalizes the operand and stores the normalized data in a scratch register. Block 266 then updates the status of the register in SPRs 220 to indicate that the register has been normalized, and block 268 then reissues the instruction with the scratch register referenced in lieu of the original denormal register. Control then passes to block 256 to execute the reissued instruction, and then back to block 252 to continue to monitor the instruction streams for additional instructions referencing denormal data.

Various modifications may be made to illustrated embodiments consistent with the invention. For example, detection of denormal data may be performed by scavenger logic, by an execution unit, by an issue unit, or by other logic in a processing core. Prenormalize instructions may be issued by scavenger logic, or by an issue unit upon request by the scavenger logic. Monitoring of instruction streams and modification of instructions may be performed, for example, by an execution unit by monitoring the instructions issued to the execution unit, checking whether any referenced registers are unprocessed, and if so, are preprocessing, and pulling from scratch registers in lieu of the referenced registers as appropriate when executing such instructions.

In addition, as noted above, other preprocessing operations may be performed, e.g., to compress/decompress data or encrypt/decrypt data, whereby the SPRs 220 may alternatively indicate whether registers store data that is compressed, decompressed, encrypted or decrypted. Furthermore, in some embodiments, preprocessed data may be stored in a software accessible register in the register file rather than a scratch register, and some instances, may be returned to the original register to replace the unprocessed data.

It will also be appreciated that additional logic may be utilized in some embodiments to manage the SPRs 220, scratch registers 218, register map 226, etc. in response to modifications made to register data in register file 210. For example, release of a register by a process or rewriting of data into a register that previously contained denormal data may require the SPRs 220, scratch register 218 and register map 226 to be updated to reflect the fact that the prenormalized data stored in the scratch register is no longer valid. In addition, in some embodiments, register file preprocessor logic 222 may be incorporated into issue unit 204, execution unit 208 or microcode unit 216, rather than being implemented as a separate component.

Other modifications may be made to the disclosed embodiments without departing from the spirit and scope of the invention. Therefore, the invention lies in the claims hereinafter appended.

What is claimed is:

1. A method of prenormalizing denormal floating point values stored in a floating point register file in a processing core of the type including an issue unit and a floating point execution unit coupled to the floating point register file, wherein the issue unit is configured to issue instructions from an instruction stream to the floating point execution unit for execution thereby, the method comprising:

speculatively scanning the floating point register file with background scavenging logic coupled to the floating point register file to identify a floating point register that stores a denormal floating point value, wherein speculatively scanning the floating point register file includes sequencing through each of a plurality of floating point registers in the floating point register file; wherein speculatively scanning the floating point register file is not performed specifically in response to any instruction in the instruction stream;

in response to identifying the floating point register, issuing a first instruction to the floating point execution unit coupled to the floating point register file during a spare cycle of the floating point execution unit, wherein the first instruction is configured to normalize the denormal floating point value to generate a normal floating point value;

storing the normal floating point value in a scratch register in response to execution of the first instruction by the floating point execution unit; and in response to a second instruction from the instruction stream that references the floating point register that stores the denormal floating point value, modifying the second instruction to reference the scratch register and issuing the modified second instruction to the floating point execution unit such that the modified second instruction uses the normal floating point value.

2. A circuit arrangement, comprising:

a hardware processing core including an issue unit, a register file and an execution unit, wherein the issue unit is configured to issue instructions from an instruction stream to the execution unit for execution thereby; and preprocessing logic coupled to the register file and the execution unit and comprising preprocessing logic circuitry, the preprocessing logic configured to speculatively preprocess an unprocessed value detected in a register in the register file prior to execution of an instruction in the instruction stream that references the register, wherein speculative preprocessing of the unprocessed value by the preprocessing logic is not performed specifically in response to any instruction in the instruction stream that references the register, and wherein speculative preprocessing of the unprocessed value by the preprocessing logic generates a processed value corresponding to the unprocessed value such that the execution unit uses the processed value, generated by the speculative preprocessing, when executing the instruction in the instruction stream.

3. The circuit arrangement of claim 2, wherein the register file is a floating point register file, wherein the execution unit is a floating point execution unit, wherein the unprocessed value is a denormal floating point value and wherein the preprocessing logic is configured to speculatively prenormalize the denormal floating point value.

4. The circuit arrangement of claim 2, wherein the unprocessed value is selected from the group consisting of a compressed value and a decompressed value, and wherein the preprocessing logic is configured to speculatively preprocess the unprocessed value by performing a preprocessing operation selected from the group consisting of compressing the unprocessed value and decompressing the unprocessed value.

5. The circuit arrangement of claim 2, wherein the unprocessed value is selected from the group consisting of an encrypted value and an unencrypted value, and wherein the preprocessing logic is configured to speculatively preprocess the unprocessed value by performing a preprocessing operation selected from the group consisting of encrypting the unprocessed value and decrypting the unprocessed value.

6. The circuit arrangement of claim 2, wherein the preprocessing logic is configured to preprocess the unprocessed value by causing a preprocessing instruction to be issued to the execution unit to preprocess the unprocessed value.

7. The circuit arrangement of claim 6, wherein the preprocessing logic is configured to cause the preprocessing instruction to be issued to the execution unit during a spare cycle of the execution unit.

8. The circuit arrangement of claim 2, wherein the preprocessing logic is configured to store the processed value in a scratch register, and wherein the instruction in the instruction stream that references the register that stores the unprocessed value is modified to reference the scratch register such that the scratch register is accessed during execution of the modified instruction by the execution unit.

9. The circuit arrangement of claim 8, further comprising a register map that maps the register with the unprocessed value to the scratch register.

10. The circuit arrangement of claim 8, wherein the execution unit is configured to modify the instruction in the instruction stream that references the register that stores the unprocessed value to reference the scratch register.

11. The circuit arrangement of claim 10, wherein the execution unit is configured to flush an execution pipeline, cause a preprocessing instruction to be issued, and reissue the instruction that references the register that stores the unprocessed value in response to determining that the register that stores the unprocessed value has not been preprocessed.

12. The circuit arrangement of claim 2, wherein the preprocessing logic comprises background scavenger logic configured to detect unprocessed values in the register file by scanning through the register file not specifically in response to any instruction in the instruction stream, wherein the background scavenger logic is configured to scan through the register file by sequencing through each of a plurality of registers in the register file.

13. An integrated circuit device including the circuit arrangement of claim 2.

14. A program product comprising a non-transitory computer readable medium and logic definition program code stored on the non-transitory computer readable medium and defining the circuit arrangement of claim 2.

15. A method of executing instructions in a processing core of the type including an issue unit, a register file and an execution unit, wherein the issue unit is configured to issue instructions from an instruction stream to the execution unit for execution thereby, the method comprising:
   detecting that a value in a register in the register file is an unprocessed value;
   speculatively preprocessing the detected unprocessed value in the register in the register file to generate a processed value corresponding to the unprocessed value, wherein speculative preprocessing the detected unprocessed value is not performed specifically in response to any instruction in the instruction stream that references the register; and
   after speculatively preprocessing the unprocessed value, executing an instruction in the instruction stream in the execution unit that references the register in the register file such that the instruction in the instruction stream uses the processed value generated by the speculative preprocessing.

16. The method of claim 15, wherein the register file is a floating point register file, wherein the execution unit is a floating point execution unit, wherein the unprocessed value is a denormal floating point value and wherein speculatively preprocessing comprises speculatively prenormalizing the denormal floating point value.

17. The method of claim 15, wherein the unprocessed value is selected from the group consisting of a compressed value and a decompressed value, and wherein speculatively preprocessing comprises performing a preprocessing operation selected from the group consisting of compressing the unprocessed value and decompressing the unprocessed value.

18. The method of claim 15, wherein the unprocessed value is selected from the group consisting of an encrypted value and an unencrypted value, and wherein speculatively preprocessing comprises performing a preprocessing operation selected from the group consisting of encrypting the unprocessed value and decrypting the unprocessed value.

19. The method of claim 15, wherein speculatively preprocessing the unprocessed value includes causing a preprocessing instruction to be issued to the execution unit to preprocess the unprocessed value.

20. The method of claim 19, wherein speculatively preprocessing the unprocessed value includes causing the preprocessing instruction to be issued to the execution unit during a spare cycle of the execution unit.

21. The method of claim 15, further comprising:
   storing the processed value in a scratch register, and
   modifying the instruction in the instruction stream that references the register that stores the unprocessed value to reference the scratch register such that the scratch register is accessed during execution of the modified instruction by the execution unit.

22. The method of claim 21, further comprising accessing a register map that maps the register with the unprocessed value to the scratch register to determine the scratch register to be referenced by the modified instruction.

23. The method of claim 21, wherein modifying the instruction in the instruction stream is performed by the execution unit.

24. The method of claim 23, wherein the execution unit is configured to flush an execution pipeline, cause a preprocessing instruction to be issued, and reissue the instruction that references the register that stores the unprocessed value in response to determining that the register that stores the unprocessed value has not been preprocessed.

25. The method of claim 15, wherein speculatively preprocessing is performed using background scavenger logic configured to detect unprocessed values in the register file by scanning through the register file not specifically in response to any instruction in the instruction stream, wherein the background scavenger logic is configured to scan through the register file by sequencing through each of a plurality of registers in the register file.

* * * * *